US009326135B2

(12) United States Patent
Rodrigues et al.

(10) Patent No.: US 9,326,135 B2
(45) Date of Patent: Apr. 26, 2016

(54) METHOD AND APPARATUS FOR SECURE COMMUNICATION IN A DIGITAL TWO WAY RADIO PROTOCOL

(75) Inventors: Anthony Rodrigues, Lighthouse Point, FL (US); Stephen R. Carsello, Plantation, FL (US); Bradley J. Rainbolt, Sunrise, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 2545 days.

(21) Appl. No.: 12/034,989

(22) Filed: Feb. 21, 2008

(65) Prior Publication Data

US 2009/0214035 A1  Aug. 27, 2009

(51) Int. Cl.
*H04W 12/02* (2009.01)
*H04L 29/06* (2006.01)
*H04W 12/04* (2009.01)

(52) U.S. Cl.
CPC ........... *H04W 12/02* (2013.01); *H04L 63/0428* (2013.01); *H04L 63/18* (2013.01); *H04W 12/04* (2013.01); *H04L 2463/061* (2013.01); *H04L 2463/081* (2013.01)

(58) Field of Classification Search
CPC . H04W 76/00; H04W 76/005; H04W 76/025; H04W 76/026; H04W 76/028; H04W 4/10
USPC ..................... 375/132; 380/270, 280; 455/411
See application file for complete search history.

(56) References Cited

U.S. PATENT DOCUMENTS

| 4,555,805 A | 11/1985 | Talbot |
| 5,142,577 A | 8/1992 | Pastor |
| 5,357,571 A | 10/1994 | Banwart |
| 5,390,252 A | 2/1995 | Suzuki et al. |
| 5,402,491 A | 3/1995 | Locascio et al. |
| 5,420,863 A | 5/1995 | Taketsugu et al. |
| 5,434,920 A | 7/1995 | Cox et al. |
| 5,559,795 A | 9/1996 | Ahl |
| 5,619,572 A | 4/1997 | Sowa |

(Continued)

FOREIGN PATENT DOCUMENTS

| EP | 1220541 A2 | 7/2002 |
| EP | 1531381 A2 | 5/2005 |
| EP | 1648112 A1 | 4/2006 |

OTHER PUBLICATIONS

Patent Cooperation Treaty, "Notification of Transmittal of the International Search Report and the Written Opinion of the International Searching Authority" for International application No. PCT/US2009/034499; Oct. 21, 2009; 12 pages.

(Continued)

*Primary Examiner* — Tae Kim
(74) *Attorney, Agent, or Firm* — Faegre Baker Daniels LLP

(57) ABSTRACT

A method and apparatus for secure communication in a digital two way radio protocol is disclosed herein. The method includes the step of, at an originating radio, generating at least one control value (505). The method further includes the step of generating an encryption key based on the at least one control value and a personal identification code at the originating radio (510). The method further includes the steps of encrypting data traffic with the encryption key to provide encrypted data traffic at the originating radio (515), transmitting the at least one control value to at least one target radio (525), and transmitting the encrypted data traffic to the at least one target radio (530).

20 Claims, 8 Drawing Sheets

(56) References Cited

U.S. PATENT DOCUMENTS

| | | | |
|---|---|---|---|
| 5,974,043 | A | 10/1999 | Solomon |
| 6,044,158 | A | 3/2000 | Terpening et al. |
| 6,094,429 | A | 7/2000 | Blanchette et al. |
| 6,212,280 | B1 | 4/2001 | Howard, Jr. et al. |
| 6,278,697 | B1 | 8/2001 | Brody et al. |
| 6,445,686 | B1 | 9/2002 | Hoffbeck et al. |
| 6,580,704 | B1 | 6/2003 | Wellig et al. |
| 6,611,607 | B1 | 8/2003 | Davis et al. |
| 6,700,964 | B2 | 3/2004 | Schmid et al. |
| 6,879,671 | B2 | 4/2005 | Schmid et al. |
| 6,959,184 | B1 | 10/2005 | Byers et al. |
| 6,965,674 | B2 | 11/2005 | Whelan et al. |
| 7,003,114 | B1 | 2/2006 | Mauro |
| 7,042,353 | B2 | 5/2006 | Stilp |
| 7,069,031 | B2 | 6/2006 | Maggenti et al. |
| 7,366,532 | B2 * | 4/2008 | Khawand et al. ............. 455/502 |
| 7,643,817 | B2 * | 1/2010 | Klug et al. .................... 455/411 |
| 2002/0016153 | A1 | 2/2002 | Sato et al. |
| 2002/0172364 | A1 | 11/2002 | Mauro |
| 2003/0012149 | A1 | 1/2003 | Maggenti et al. |
| 2004/0068649 | A1 | 4/2004 | Haller et al. |
| 2005/0025315 | A1 | 2/2005 | Kreitzer |
| 2005/0079883 | A1 * | 4/2005 | Khawand et al. ............. 455/502 |
| 2005/0129065 | A1 | 6/2005 | Loy et al. |
| 2006/0045136 | A1 | 3/2006 | Rainbolt et al. |
| 2006/0046756 | A1 | 3/2006 | Kies |
| 2006/0073795 | A1 | 4/2006 | Mayblum et al. |
| 2006/0104333 | A1 * | 5/2006 | Rainbolt et al. ............. 375/132 |
| 2006/0123224 | A1 | 6/2006 | Klug et al. |
| 2006/0251107 | A1 * | 11/2006 | Geren et al. .................. 370/462 |
| 2006/0269065 | A1 | 11/2006 | Lindteigen |
| 2006/0281480 | A1 * | 12/2006 | Klug et al. .................... 455/518 |

OTHER PUBLICATIONS

Security Overview of Bluetooth. Dave Singelee, Bart Preneel, Cosic Internal Report, Jun. 2004.

Wireless Optical Spread Spectrum Communications. Data Security Improvement in Wireless Links. Jose A. Rabadan, Santiago T. Perez, Rafael Perez, Francisco A. Delgado, Miguel A. Bacallado. 2005.

Industrial Controls. Industrial Insights. Interference and Security Considerations for Wireless Communications in an Industrial Environment. Stephen Muenstermann, Honeywell Process Solutions. Mar. 2007.

U.S. Appl. No. 11/005,787, filed Dec. 7, 2004—Keith M. Klug et al.—Assignee: Motorola, Inc.

Arthur Goldberg et al., "Secure Web Server Performance Dramatically Improved by Caching SSL Session Keys", Jun. 23, 1998, Courant Institute of Mathematical Science, New York University; 8 pages.

Rogue Wave Software, Inc., "Secure Communication Module User's Guide"; http://roguewave.com/support/docs/leif/securityug/5-6.html; 2002, 1 page.

Bruce Schneier, "Applied Cryptography", 1996, p. 48, 2nd Edition, John Wiley & Sons, Inc.

L3 Communications, "FNBDT Future Narrow Band Digital Terminal—OMNI Secure Terminal"; http://www.1-3com.com/cs-east/infosec/omni/ie_infosec_omni_fnbdt.html; 2 pages.

General Dynamics Communications Systems, "FNBDT Signaling Plan"; Sep. 1, 1999; Revision 1.1; 213 pages.

* cited by examiner

METHOD AND APPARATUS FOR SECURE COMMUNICATION IN A DIGITAL TWO WAY RADIO PROTOCOL

FIELD OF THE INVENTION

The claimed subject matter concerns secure communication between mobile devices in direct communication with each other, and more particularly, methods for encrypting data traffic during such communication.

DESCRIPTION OF THE RELATED ART

In wireless communication systems, mobile devices communicate with each other by transmitting and receiving wireless signals. Communication over the wireless medium is inherently not secure, however, as any receiving device physically located sufficiently close to a transmitting device can receive and process wireless signals from the transmitting device. The efforts of a third party receiving device to receive signals that are not intended for the third party receiving device and to further process them so as to obtain information contained in the signals is commonly referred to as "eavesdropping." Eavesdropping can be a significant problem, as users of mobile devices typically desire secure communication, for example, to carry on a private conversation or to exchange sensitive data.

The risk of eavesdropping can be greatly reduced, however, through the use of well known encryption techniques. For example, a mobile device can use an encryption "key," which can be a pseudo-random vector of bits, to transform an information bit sequence into an encrypted bit sequence, and can further transmit the encrypted bit sequence over a wireless channel. An intended recipient of the transmitted signal that knows the identity of the encryption key should be able to easily decrypt the encrypted bit sequence to produce the information bit sequence. However, an eavesdropper that does not know the identity of the encryption key generally cannot decrypt the encrypted bit sequence without significant effort.

In a communication system that comprises a network infrastructure, procedures used in the setting up of secure communication sessions can be performed easily by the infrastructure. For example, the infrastructure can perform key distribution, in which a first base station can send an encryption key to a first mobile device and a second base station can send the same encryption key, or a related encryption key, to the second mobile device to allow the first and second mobile devices to perform secure communication. As another example, the network can maintain "crypto-synchronization" by periodically updating the encryption keys used by the first and second mobile devices. Reestablishing crypto-synchronization is necessary, for example, if state machines used in the encryption and decryption processes at the first and second mobile devices lose synchronization with each other.

In contrast, in an infrastructureless communication system, such as that known by the trade name MOTOtalk, developed by Motorola Inc., key management and crypto synchronization are more difficult as the mobile devices must perform those functions without the assistance of a network. An efficient method for setting up and maintaining secure communication sessions in infrastructureless communication systems is therefore needed.

SUMMARY OF THE INVENTION

A first method for secure communication in a digital two way radio protocol is disclosed herein. The method can include the step of, at an originating radio, generating at least one control value. The method can further include the step of generating an encryption key based on the at least one control value and a personal identification code at the originating radio, and encrypting data traffic with the encryption key to provide encrypted data traffic at the originating radio. The method can further include the step of transmitting, using a direct communication protocol, the at least one control value to at least one target radio. The method can also include the step of transmitting, using a direct communication protocol, the encrypted data traffic to the at least one target radio. The transmitting the encrypted data traffic can occur in an unlicensed frequency band.

In the method, the step of transmitting the encrypted data traffic can be performed using a frequency hopping protocol. The at least one control value can comprise a frequency hopping seed, and the method can further comprise generating a frequency hopping pattern derived from the frequency hopping seed. A frequency hopping seed generated for use in a first PTT burst can be different than a frequency hopping seed generated for use in a second, subsequent PTT burst.

Also in the method, the step of transmitting the at least one control value can occur over a dedicated control channel. Furthermore, the at least one control value can comprise a Private Identification Number (PID) of the originating radio. The method allows for efficient setup of secure communication sessions in an infrastructureless communication system.

A second method for secure communication in a digital two way radio protocol is also disclosed herein. The method can include the step of, at a target radio, receiving, using a direct communication protocol, encrypted data traffic from at least one originating radio. The method can also include the step of receiving, using a direct communication protocol, at least one control value from the at least one originating radio. The method can further include the steps of generating a decryption key based on the at least one control value and a personal identification code at the target radio and decrypting the encrypted data traffic with the decryption key to provide decrypted data traffic at the target radio.

A digital two-way radio is also disclosed, in which the radio can comprise a transceiver that is capable of transmitting wireless signals and receiving wireless signals. The radio can further comprise a machine readable storage medium, and a processor coupled to the transceiver. The transceiver can be operable to perform the steps of generating at least one control value, generating an encryption key based on the at least one control value and a personal identification code, and encrypting data traffic with the encryption key to provide encrypted data traffic. The transceiver can be further operable to perform the step of transmitting, using a direct communication protocol, the at least one control value to at least one target radio. The transceiver can also be operable to perform the step of transmitting, using a direct communication protocol, the encrypted data traffic to the at least one target radio.

BRIEF DESCRIPTION OF THE DRAWINGS

Features that are believed to be novel are set forth with particularity in the appended claims. The claimed subject matter may best be understood by reference to the following description, taken in conjunction with the accompanying drawings, in the several figures of which like reference numerals identify like elements, and in which:

DETAILED DESCRIPTION

Figure 1:
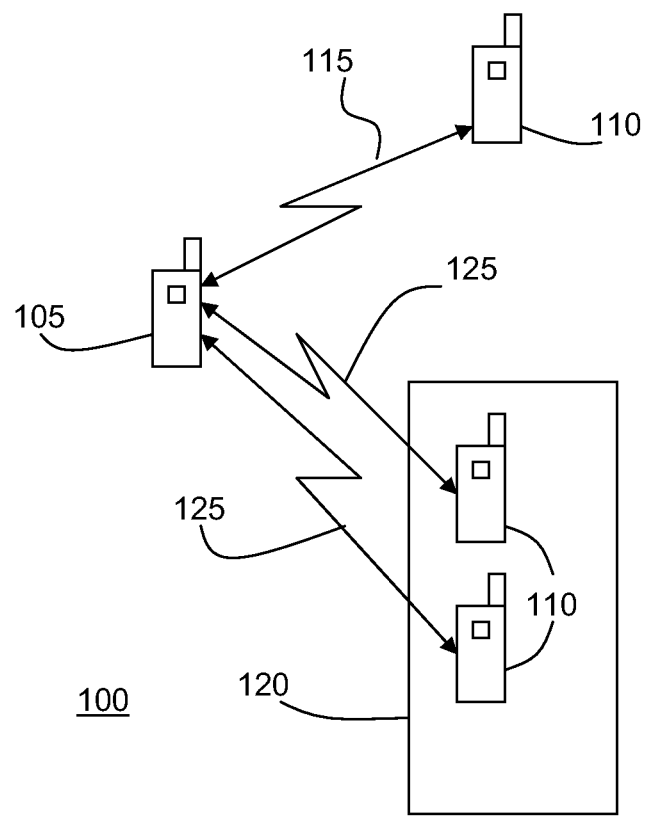
FIG. 1 illustrates an example of an infrastructureless communication system comprising mobile devices.

As required, detailed embodiments of the claimed subject matter are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ the claimed subject matter in virtually any appropriately detailed structure. Further, the terms and phrases used herein are not intended to be limiting but rather to provide an understandable description.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, is defined as connected, although not necessarily directly, and not necessarily mechanically.

The term "transceiver" can be defined as any component or group of components that is capable of at least transmitting communications signals and at least receiving communication signals. The term "processor" can mean any component or group of components, including any suitable combination of hardware and software that is capable of carrying out any of the processes described herein. The term "protocol" can refer to a set of pre-determined rules used by two or more mobile devices to exchange signals. The term "radio" is used interchangeably with the term "mobile device," which will be described later in the disclosure. A push-to-talk (PTT) burst can refer to a process in which a first mobile device can transmit a signal to at least one other mobile device during a period of time.

The term "encryption" can refer to a process in which information bits are altered to produce encrypted bits in a manner in which the information bits cannot be recovered easily from the encrypted bits, as known in the art. The term "decryption" can refer to a process in which information bits are recovered from encrypted bits, also known in the art. The term "infrastructureless" can describe a communication system comprising mobile devices that can communicate without infrastructure elements, such as a base station.

A method and apparatus for secure communication in a digital two way radio protocol is disclosed herein. The method can include the step of, at an originating radio, generating at least one control value. The method can further include the steps of generating an encryption key based on the at least one control value and a personal identification code at the originating radio, and encrypting data traffic with the encryption key to provide encrypted data traffic at the originating radio. The method can also include the step of transmitting, using a direct communication protocol, the at least one control value to at least one target radio. The method can further include the step of transmitting, using a direct communication protocol, the encrypted data traffic to the at least one target radio. The transmitting the encrypted data traffic can occur in an unlicensed frequency band.

In the method, the step of transmitting the encrypted data traffic can be performed using a frequency hopping protocol. The at least one control value can comprise a frequency hopping seed, and the method can further comprise generating a frequency hopping pattern derived from the frequency hopping seed. A frequency hopping seed generated for use in a first PTT burst can be different than a frequency hopping seed generated for use in a second, subsequent PTT burst.

Also in the method, the step of transmitting the at least one control value can occur over a dedicated control channel. Furthermore, the at least one control value can comprise a Private Identification Number (PID) of the originating radio. The method allows for efficient setup of secure communication sessions in an infrastructureless communication system.

Referring to FIG. 1, an infrastructureless communication system 100 can include a first mobile device 105 that can communicate with a second mobile device 110 on a wireless channel 115. The system 100 can also include a mobile device 105 that can communicate with a group 120 of at least one mobile device 110 on at least one wireless channel 125. As an example, each of the mobile devices 105 and 110 can employ a direct communication protocol in accordance with that known by the trade name MOTOtalk, sold by Motorola Inc., though one skilled in the art will recognize that each of the mobile devices 105 and 110 can employ any other suitable direct communication protocol. As another example, the mobile devices 105 and 110 can be operable to communicate in a frequency spectrum which permits frequency hopping, in which the spectrum can be unlicensed or licensed. The term "direct communication protocol" can refer to a protocol in which at least one mobile device 105 can communicate over a wireless channel with at least one mobile device 110 without using a network. As will be explained below, each of the mobile devices 105 and 110 can be capable of performing encryption and decryption.

Figure 2:
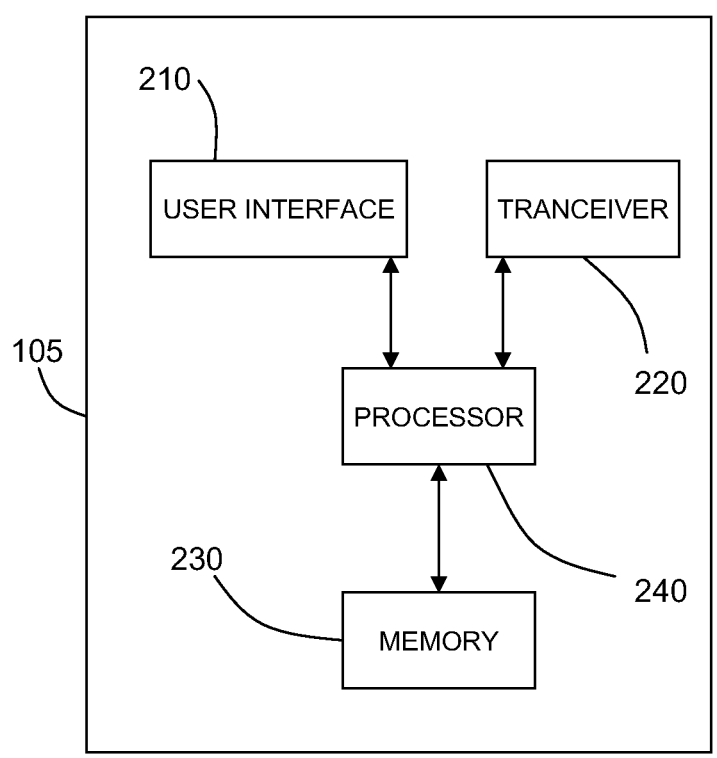
FIG. 2 shows an example of a block diagram of a mobile device.

FIG. 2. shows a block schematic diagram of a mobile device 105 in accordance with the communication system 100. It should be understood that this arrangement can also represent a block diagram of a mobile device 110. In one arrangement, the mobile device 105 will typically include a processor 240, a transceiver 220, a memory 230, and a user interface 210. The memory 230 may be a part of the processor 240 or may be a separate unit under the control of the processor 240. The user interface 210 and the transceiver 220 can both be coupled to and under the control of the processor 240. As an example, the user interface 210 typically includes a display, a speaker, a keypad, or a vibration mechanism, although other suitable components may be part of the user interface 210.

Figure 3:
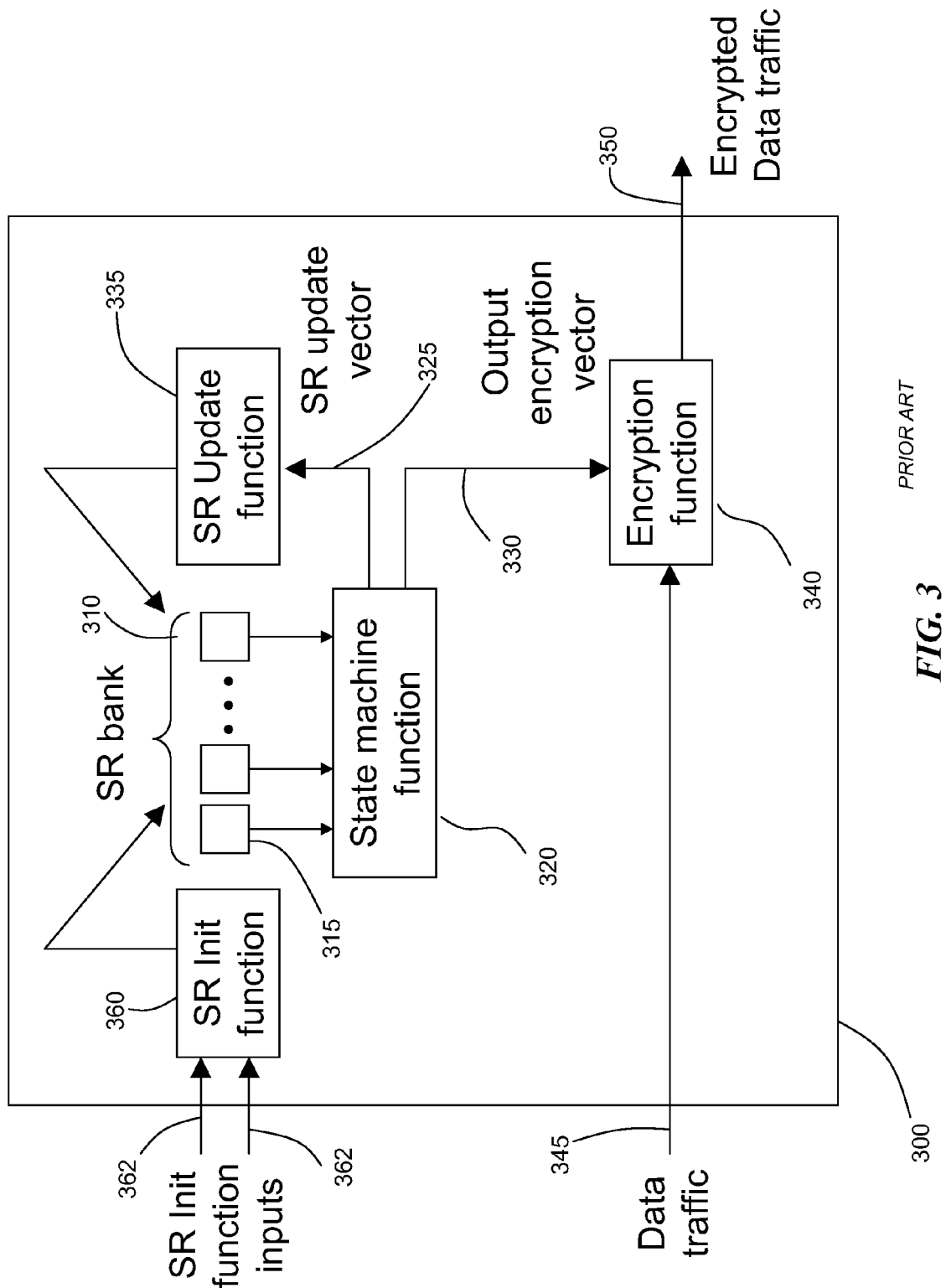
FIG. 3 shows an example of an encryption algorithm that can be used to encrypt data traffic.

Referring to FIG. 3, there is shown a block diagram of an exemplary encryption algorithm 300 that can be used to encrypt data traffic in a mobile device 105, as is known in the art. The encryption algorithm 300 typically comprises a shift register (SR) bank 310 that uses at least one data storage unit 315, in which the contents of the SR bank 310 can be stored at known locations in the memory 230 of the mobile device 105. An encryption key is used to initialize or to update the contents of the SR bank 310. The encryption algorithm 300 can accept at least one input value 362, which can be used in the SR initialization function 360.

The SR initialization function 360 initializes the values stored in the data storage units 315 of the SR bank 310, and typically performs at least one mathematical operation. The mathematical operation may utilize an input value 362, although it should be understood that any suitable combination of arithmetic functions can be utilized by the SR initialization function 360. In one embodiment, the SR initialization function 360 can be performed at the beginning of a communication. In another embodiment, the SR initialization function 360 can be performed at known periodic time intervals to assist in crypto-synchronization, as is known in the art.

A state machine function 320 can operate on the contents of the SR bank 310 at a first clock time to produce at least a digital output encryption vector 330 and a digital SR update vector 325. The state machine function 320 can employ standard logical arithmetic functions such as exclusive-or (XOR), but it will be appreciated by one skilled in the art that any function or combination of functions can be used. The SR update vector 325 can be used by the SR update function 335 to update the contents of the SR bank 310 for use at a second, subsequent clock time. As an example, the SR update function 335 can replace the contents of the SR bank 310 with the SR update vector 325, but it will be appreciated that any suitable function can be used as the SR update function 335. The output encryption vector 330 can be used by the encryption function 340 to encrypt data traffic 345 to produce encrypted data traffic 350. As an example, the output encryption vector 330 can be the same length as a block of data traffic 345, and the encryption function 340 can XOR the output encryption vector 330 with the block of data traffic 345 to produce a block of encrypted data traffic 350. However, it will be appreciated that any suitable function can be used as the encryption function 340.

Figure 4:
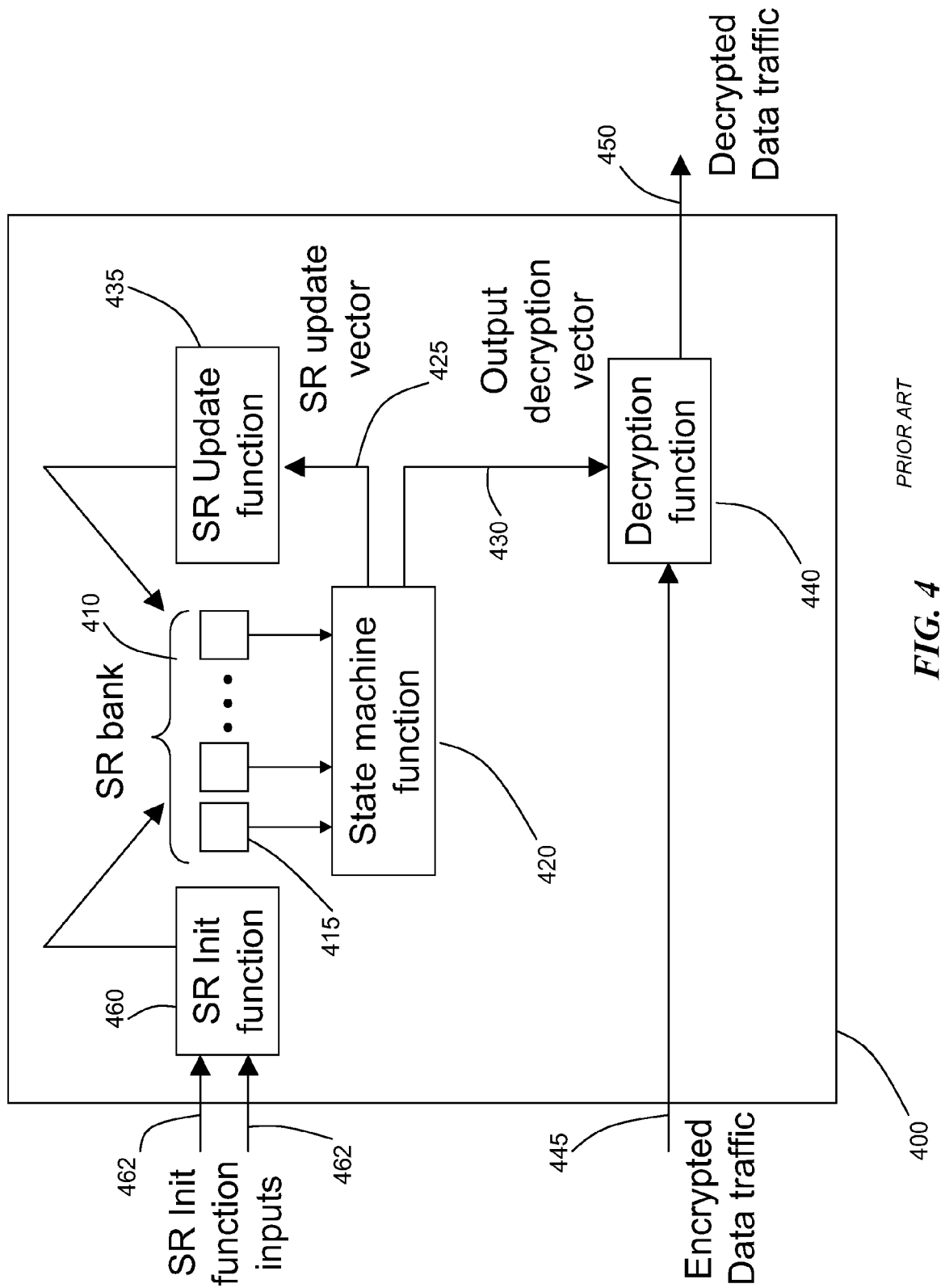
FIG. 4 shows an example of a decryption algorithm that can be used to decrypt encrypted data traffic.

Referring to FIG. 4, a block diagram is shown of an exemplary decryption algorithm 400 that can be used to decrypt data traffic in a mobile device 105, as is known in the art. The decryption algorithm 400 can operate in substantially the same manner as the encryption algorithm 300, although it should be understood that any suitable decryption algorithm can be used to perform the secure communication described in this disclosure. The decryption algorithm 400 can comprise a shift register (SR) bank 410 that can comprise at least one data storage unit 415, in which the contents of the SR bank 410 can be stored at known locations in the memory 230 of the mobile device 105. As will be explained later, a decryption key can be used to initialize or to update the contents of the SR bank 410. The decryption algorithm 400 can accept at least one input value 462, which can be used in the SR initialization function 460.

The SR initialization function 460 can perform at least one mathematical operation that may utilize the at least one input value 462 to initialize the values stored in the data storage units 415 of the SR bank 410, although it should be understood that any suitable combination of arithmetic functions can be utilized by the SR initialization function 460. In one example, the SR initialization function 460 can be performed at the beginning of a communication. As another example, the SR initialization function 460 can be performed at known periodic time intervals to assist in crypto-synchronization, as is known in the art.

A state machine function 420 can operate on the contents of the SR bank 410 at a first clock time to produce at least a digital output decryption vector 430 and a digital SR update vector 425. The state machine function 420 can employ standard logical arithmetic functions such as XOR, but it will be appreciated by one skilled in the art that any combination of any suitable functions can be used. The SR update vector 425 can be used by the SR update function 435 to update the contents of the SR bank 410 for use at a second, subsequent clock time. As an example, the SR update function 435 can replace the contents of the SR bank 410 with the SR update vector 425, but it will be appreciated that any suitable function can be used as the SR update function 435. The output decryption vector 430 can be used by the decryption function 440 to decrypt the encrypted data traffic 445 to produce decrypted data traffic 450. As an example of a decryption function 440, the output decryption vector 430 can be the same length as a block of data traffic 445, and the decryption function 440 can XOR the output decryption vector 430 with the block of data traffic 445 to produce a block of decrypted data traffic 450. However, it will be appreciated that any suitable function can be used as the decryption function 440.

Figure 5:
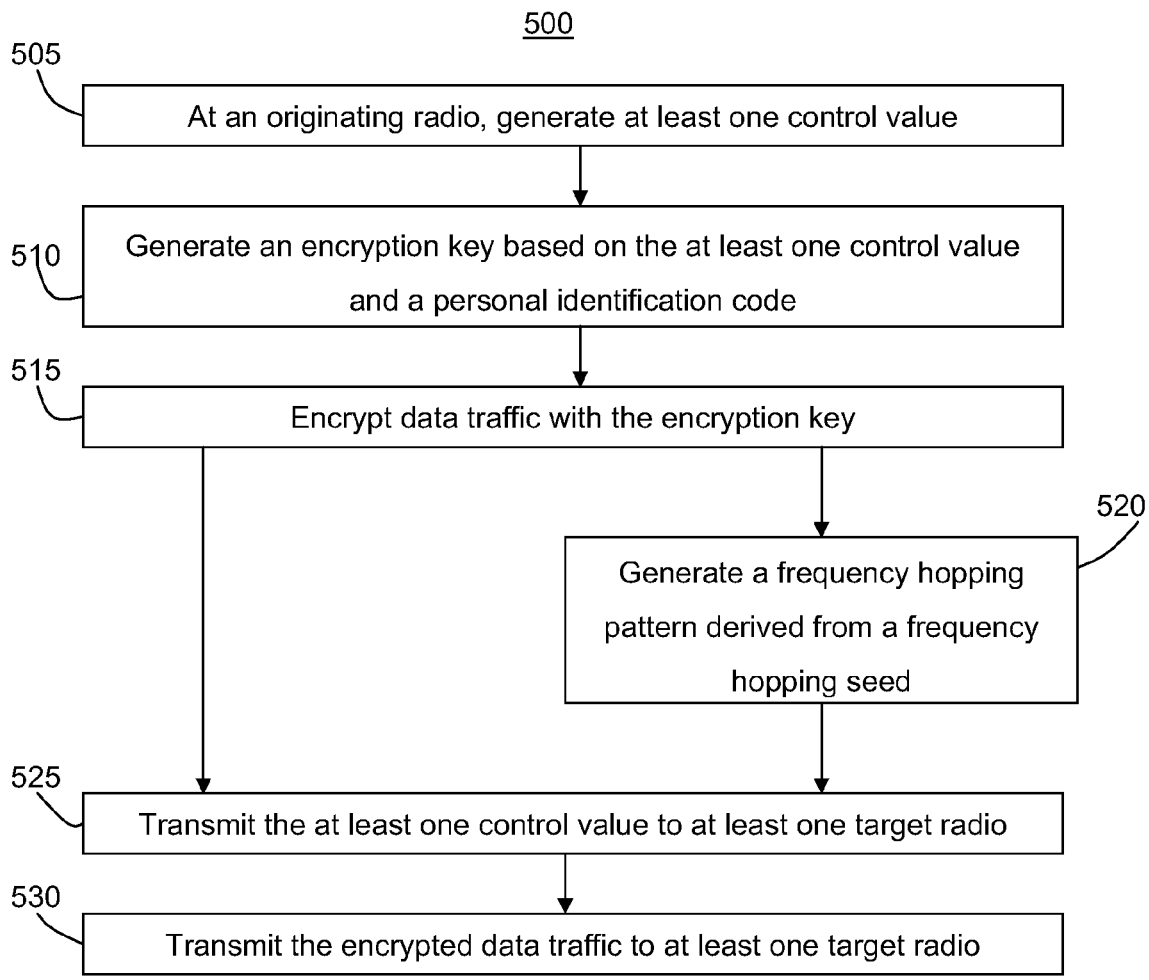
FIG. 5 shows an example of a method for secure communication at an originating radio.

Referring to FIG. 5, a method 500 for secure communication at an originating radio is shown. To describe this method, reference will be made to FIGS. 7 and 8, which illustrate examples of secure communication in a system which employs a direct communication protocol. As an example, the direct communication protocol can be MOTOtalk. Details of the MOTOtalk protocol, such as the operation of Preamble slots 702/802, Sync slots 704/804, Traffic slots 706/806, and the Frequency hopping seed 714/814 are known in the art and will not be described further. The steps of the method 500 are not necessarily limited to the particular order in which they are presented in the figure. Also, the method 500 can have a greater number of steps or a fewer number of steps than those shown in the figure.

In step 505 of the method 500, at least one control value can be generated at an originating radio. A control value can be a value that can be used to set up a communication session between at least two mobile devices 105. For example, in FIG. 7, the Private Identification Number (PID) 712 of an originating radio can be stored in the memory 230 of the mobile device 105, and can be used by a target radio to identify the caller. As another example, a frequency hopping (FH) seed 714 can be used in the generation of a frequency hopping pattern for use in determining the frequency locations of the data traffic slots 706. It should be understood, however, that these examples serve to clarify the definition of control value, but should not limit the definition in any manner.

Figure 7:
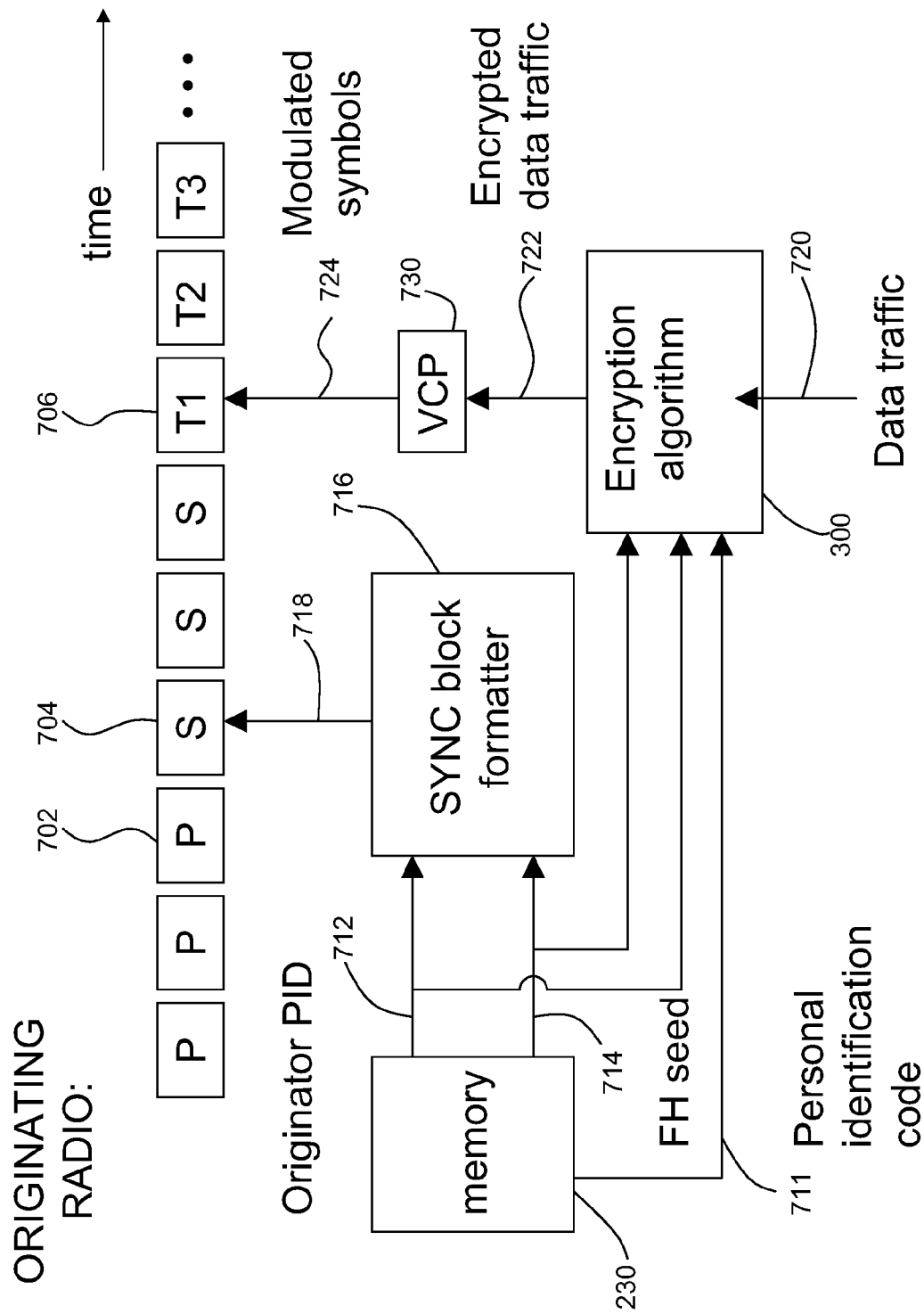
FIG. 7 shows an example of a method for secure communication at an originating radio utilized in conjunction with the MOTOtalk protocol.

In step 510, an encryption key can be generated based on the at least one control value, as described above, and a personal identification code. A personal identification code can comprise alphanumeric symbols or any suitable combination of characters. In FIG. 7, the frequency hopping seed 714 and the PID 712 of the Originating radio can be input to the encryption algorithm 300, for use in forming an encryption key.

In step 515, the encryption key can be used to encrypt data traffic to produce encrypted data traffic. The encryption process can be performed using the encryption algorithm 300 illustrated in FIG. 3, or any other suitable algorithm. In FIG. 7, the encryption algorithm 300 can encrypt the data traffic 720 to produce the encrypted data traffic 722.

In step 520, a frequency hopping pattern can be derived from a frequency hopping seed. In FIG. 7, the frequency hopping seed 714 can be used to determine a frequency hopping pattern for the traffic slots 706, as known in the art.

In step 525, the at least one control value generated at the originating radio can be transmitted to at least one target radio. The transmission can be performed using MOTOtalk, CDMA, GSM, or any suitable wireless protocol. In the example of FIG. 7, the Originator PID 712 and the FH seed 714 can be processed by the SYNC block formatter 716 to produce modulated symbols 718 which can be transmitted on at least one SYNC slot 704. Returning to step 525, the transmission of the at least one control value can occur on a dedicated control channel, which can refer to a portion of the throughput capacity of a system, in which the portion can generally be available for the exchange of at least one control value. As an example, in the MOTOtalk protocol described in FIGS. 7 and 8, a dedicated control channel can refer to at least a portion of the modulated symbols 718 that are transmitted on at least one SYNC slot 704. As another example, at least one code in a CDMA system can be allocated for the transmission of at least one control value. These examples should serve to clarify the definition of dedicated control channel, but should not limit the definition in any manner.

In step 530, the encrypted data traffic can be transmitted to at least one target radio. The transmission can be performed using MOTOtalk, CDMA, GSM, or any suitable wireless protocol. As an example, in the MOTOtalk protocol described in FIGS. 7 and 8, the encrypted data traffic 722 can be processed by a Voice Channel Procedure (VCP) 730 to produce modulated symbols 724, which can be transmitted on at least one traffic slot 706. The VCP can comprise functions such as error correction coding, interleaving, and importance ordering of audio bits, as is well known in the art.

Figure 6:
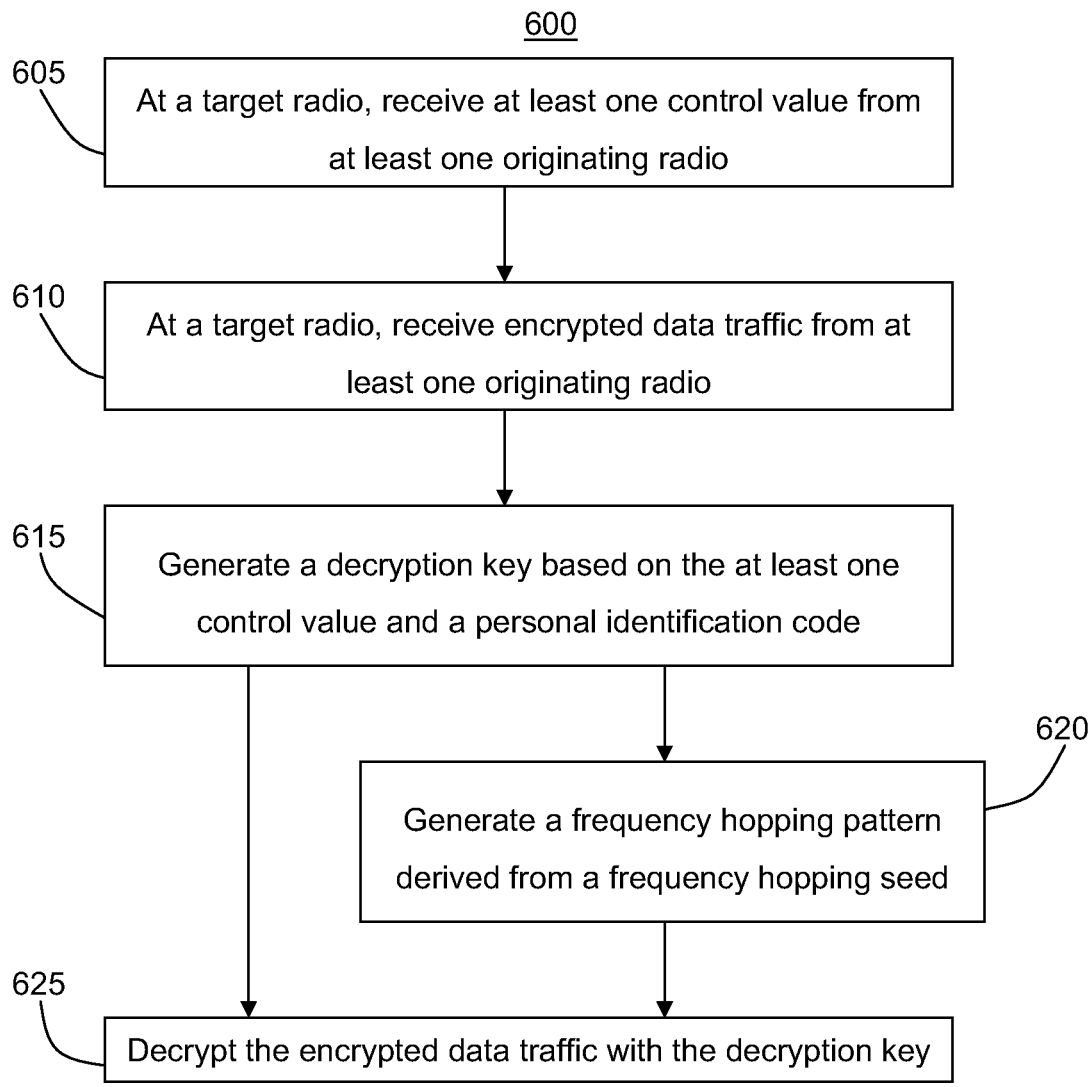
FIG. 6 shows an example of a method for secure communication at a target radio.

Referring to FIG. 6, a method 600 for secure communication at a target radio is shown. To describe this method, reference will be made to FIGS. 7 and 8, which illustrate examples of secure communication in a system which employs the proprietary MOTOtalk protocol. The steps of the method 600 are not limited to the particular order in which they are presented in the figure. Also, the method 600 can have a greater number of steps or a fewer number of steps than those shown in the figure.

In step 605 of the method 600, at least one control value can be received at a target radio. As previously described, a control value can be a value that can be used to set up a communication session between at least two mobile devices 105. For example, in FIG. 8, the PID 812 of an originating radio can be used by the target radio to identify the caller. As another example, a frequency hopping (FH) seed 814 can be used in the generation of a frequency hopping pattern for use in determining the frequency locations of the data traffic slots 806. It should be understood, however, that these examples serve to clarify the definition of control value, but should not limit the definition in any manner.

In step 610, encrypted data traffic from at least one originating radio can be received at the target radio. The reception can be performed using MOTOtalk, CDMA, GSM, or any suitable wireless protocol. As an example, in the MOTOtalk protocol described in FIGS. 7 and 8, modulated symbols 824 received on at least one traffic slot 806 can be processed by a VCP 830 to produce encrypted data traffic 822. As previously described, the VCP can comprise functions such as error correction coding, interleaving, and importance ordering of audio bits, as is well known in the art.

Figure 8:
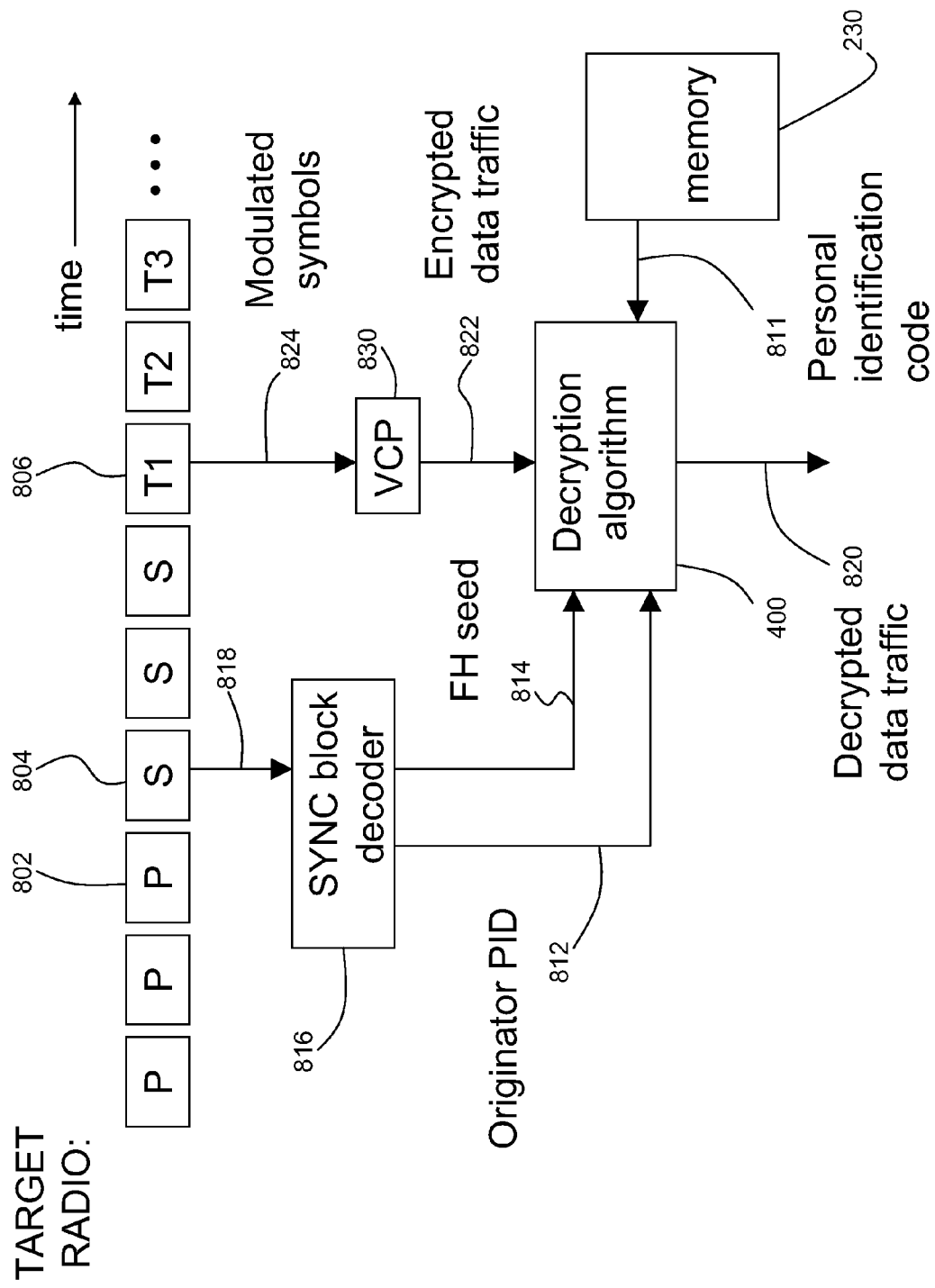
FIG. 8 shows an example of a method for secure communication at a target radio utilized in conjunction with the MOTOtalk protocol.

In step 615, a decryption key can be generated based on the at least one control value and a personal identification code, in which the term "personal identification code" was described above. In FIG. 8, the frequency hopping seed 814 and the PID 812 of the Originating radio can be input to the decryption algorithm 400, for use in forming a decryption key.

In step 620, a frequency hopping pattern can be derived from a frequency hopping seed. In FIG. 8, the frequency hopping seed 814 can be used to determine a frequency hopping pattern for the traffic slots 806, as known in the art. In step 625, the decryption key can be used to decrypt encrypted data traffic to produce decrypted data traffic. The decryption process can be performed using the decryption algorithm 400 illustrated in FIG. 4, or any other suitable algorithm. In FIG. 8, the decryption algorithm 400 can decrypt the encrypted data traffic 822 to produce the decrypted data traffic 820.

It will be appreciated by those skilled in the art that the personal identification code is a code that is not transmitted using the direct communication protocol, but that it is known or made known to the target radio or radios. In the above description, the personal identification code can be entered into the mobile device 105 manually through the user interface 210, or can be stored in the memory 230 of the mobile device 105. As a first example, the personal identification code can be exchanged verbally between users of the devices. As a second example, the personal identification code can be pre-programmed into the memory 230 of at least one device 105 during the time of manufacture. In another example, the personal identification code can be chosen by another individual, such as a system administrator, and manually programmed into the memory 230 of at least one mobile device 105. As another example, the personal identification code can be exchanged between mobile devices 105 and 110 during a separate communication session, which can be non-secure or can use a different secure communication protocol than those disclosed. The previous examples serve to clarify the term "personal identification code," but it is understood that they should not limit the scope of the term in any manner, and any suitable method of choosing the personal identification code can be employed in the methods disclosed.

While the various embodiments of the present invention have been illustrated and described, it will be clear that the claimed subject matter is not so limited. Numerous modifications, changes, variations, substitutions and equivalents will occur to those skilled in the art without departing from the spirit and scope of the present invention as defined by the appended claims.

What is claimed is:

1. A method for secure communication in a digital two way radio protocol, comprising:
   at an originating radio, generating at least one control value;
   generating an encryption key based on the at least one control value and a personal identification code at the originating radio;
   encrypting data traffic with the encryption key to provide encrypted data traffic at the originating radio;
   transmitting, using a direct communication protocol, the at least one control value to at least one target radio;
   exchanging, using means other than the direct communication protocol, the personal identification code with the at least one target radio; and
   transmitting, using a direct communication protocol, the encrypted data traffic to the at least one target radio.

2. The method according to claim 1, wherein the transmitting the at least one control value occurs over a dedicated control channel.

3. The method according to claim 2, wherein the transmitting the at least one control value occurs during at least one synchronization slot over the dedicated control channel.

4. The method according to claim 1, wherein the at least one control value comprises a Private Identification Number (PID) of the originating radio.

5. The method according to claim 1, wherein the transmitting the encrypted data traffic is performed using a frequency hopping protocol.

6. The method according to claim 5, wherein the at least one control value comprises a frequency hopping seed, and the method further comprises generating a frequency hopping pattern derived from the frequency hopping seed.

7. The method according to claim 6, wherein the frequency hopping seed generated for a first PTT (push-to-talk) burst is different than the frequency hopping seed generated for a second, subsequent PTT (push-to-talk) burst.

8. The method according to claim 1, wherein the transmitting the encrypted data traffic occurs in an unlicensed frequency band.

9. A method for secure communication in a digital two way radio protocol, comprising:
   at a target radio, receiving, using a direct communication protocol, encrypted data traffic from at least one originating radio;
   receiving, using the direct communication protocol, at least one control value from the at least one originating radio;
   receiving, using means other than the direct communication protocol, a personal identification code from the at least one originating radio;
   generating a decryption key, based on the at least one control value and the personal identification code, at the target radio; and
   decrypting the encrypted data traffic with the decryption key to provide decrypted data traffic at the target radio.

10. The method according to claim 9, wherein the receiving at least one control value occurs over a dedicated control channel.

11. The method according to claim 10, wherein the receiving at least one control value occurs during at least one synchronization slot over the dedicated control channel.

12. The method according to claim 9, wherein the at least one control value comprises a Private Identification Number (PID) of the originating radio.

13. The method according to claim 9, wherein the receiving encrypted data traffic is performed using a frequency hopping protocol.

14. The method according to claim 13, wherein the at least one control value comprises a frequency hopping seed, and the method further comprises generating a frequency hopping pattern derived from the frequency hopping seed.

15. The method according to claim 14, wherein the frequency hopping seed generated for a first PTT (push-to-talk) burst is different than the frequency hopping seed generated for a second, subsequent PTT (push-to-talk) burst.

16. A digital two-way radio, comprising:
   a transceiver that is capable of transmitting wireless signals and receiving wireless signals;
   a machine readable storage medium; and
   a processor coupled to the transceiver, wherein the processor is operable to:
      generate at least one control value;
      generate an encryption key based on the at least one control value and a personal identification code;
      encrypt data traffic with the encryption key to provide encrypted data traffic;
      transmit, using a direct communication protocol, the at least one control value to at least one target radio;
      make known the personal identification code to the at least one target radio using a means other than the direct communication protocol; and
      transmit, using a direct communication protocol, the encrypted data traffic to the at least one target radio.

17. The digital two-way radio according to claim 16, wherein the transmitting the at least one control value occurs over a dedicated control channel.

18. The digital two-way radio according to claim 17, wherein the transmitting the at least one control value occurs during at least one synchronization slot over the dedicated control channel.

19. The digital two-way radio according to claim 16, wherein the at least one control value comprises a Private Identification Number (PID) of the digital two-way radio.

20. The digital two-way radio according to claim 16, wherein the transmitting the encrypted data traffic is performed using a frequency hopping protocol, and the at least one control value comprises a frequency hopping seed.

* * * * *